Patented Aug. 25, 1953

2,650,216

UNITED STATES PATENT OFFICE 2,650,216

CRYSTALLINE NAPHTHALENE SULFONATE SALTS OF STREPTOMYCIN AND DIHYDROSTREPTOMYCIN

Rudolph A. Carboni, Yonkers, N. Y., and Peter P. Regna, West New York, N. J., assignors to Chas. Pfizer & Co., Inc., a corporation of Delaware No Drawing. Application March 29, 1949, Serial No. 84,264

6 Claims. (Cl. 260—210)

This invention relates to novel crystalline salts of antibiotic substances and to methods for their preparation. More particularly, it relates to crystalline sulfonic acid salts of streptomycins containing a salt-forming amino group. Still more particularly, it relates to naphthalene β-sulfonic acid salts of streptomycin and dihydrostreptomycin.

Streptomycin is obtained from elaboration products, formed during the growth of the microorganism *Actinomyces griseus* in a suitable culture medium, by adsorption on activated carbon followed by elution with an acidic solvent (Proc. Soc. of Exp. Biol. and Med. 49, 207-212 (1942)). The product so obtained is a streptomycin salt, such as streptomycin trihydrochloride, of relatively low potency or antibiotic activity. Streptomycin can also be recovered from the culture medium by precipitation of its water-insoluble azo sulfonic acid dye salt, for example, the salt of Congo red or helianthic acid, and can be recovered from these dye salts with some difficulty by known procedures. The crude streptomycin salts so obtained can be further purified by procedures involving chromatographic methods. In other methods of purification, the streptomycin is converted to the reineckate, reineckate sulfate, or the helianthate and recrystallized before subsequent conversion to the desired mineral acid salt.

The relatively pure streptomycin has been converted to the crystalline streptomycin trihydrochloride-calcium chloride double salt (U. S. Patent 2,446,102) which has been found to have great therapeutic value. The crude streptomycin concentrates are not desirable for extensive use as they are not chemically pure compounds susceptible to standardization by purely chemical tests, and must be standardized by biological means. The various crystalline dye and other complex salts of streptomycin, with the exception of streptomycin trihydrochloride-calcium chloride double salt, are not useful therapeutic agents, and so must be converted to simple salts such as hydrochloride or sulfate before use as a therapeutic agent.

An object of this invention is the preparation of novel crystalline salts of a streptomycin. A further object is the preparation of novel crystalline sulfonic acid salts of streptomycin which can easily be converted to the therapeutically useful mineral acid salts. A still further object is to provide an efficient method for the preparation of crystalline naphthalene β-sulfonic acid salts of streptomycin and dihydrostreptomycin. A still further object is to provide an efficient and convenient method for separating streptomycin from complex mixtures containing this compound. Further objects will appear hereinafter.

It has now been found that the crystalline naphthalene β-sulfonic acid salts of streptomycin and its derivatives containing a salt-forming amino group can be prepared directly in aqueous solution and recovered directly therefrom.

In one method for preparing the naphthalene β-sulfonic acid salt of streptomycin according to the present invention, a streptomycin salt, e. g. streptomycin trihydrochloride, in aqueous solution is reacted with a water-soluble salt of naphthalene β-sulfonic acid in aqueous solution to precipitate white crystals of the difficultly water-soluble naphthalene β-sulfonic acid salt of streptomycin. This reaction is illustrated by the following equation:

$C_{21}H_{39}N_7O_{12} \cdot 3HCl + 3C_{10}H_7SO_3Na \rightarrow$
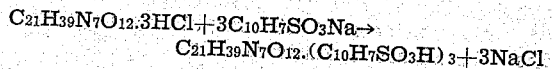
$C_{21}H_{39}N_7O_{12} \cdot (C_{10}H_7SO_3H)_3 + 3NaCl$ The crystals are readily filtered and washed with cold water. Additional product can be precipitated by concentrating the mother liquor. If it is desired, the naphthalene β-sulfonic acid salt of streptomycin can be recrystallized from water. After the salt has been purified through a recrystallization, it has the following properties:

Biological activity γ/mg. (*E. coli*) ____ 480 γ/mg.
Maltol _____ 490 γ/mg.
Streptidine _____ 490 γ/mg.
$[\alpha]_D$ _____ —54.3°

The theoretical potency for this compound is about 480 γ/mg.

The biological activity of streptomycin and dihydrostreptomycin is determined in terms of the inhibition of growth of microorganisms such as *E. coli* and *B. subtilis* in comparison with a standard of known activity (J. B. C. 153, 249 (1944); J. Bact. 47, 199 (1944)). The potency may also be determined chemically by measuring the amount of maltol formed upon alkaline hydrolysis of streptomycin under specified conditions and comparing with a standard, or by testing for the guanido grouping in the streptidine moiety of the molecule. The chemical value of the potency of the dihydrostreptomycin is obtained through the streptidine analysis.

In a preferred method for preparing the naphthalene β-sulfonic acid salts of this invention, a water-soluble streptomycin acid salt, for example, streptomycin sulfate in aqueous solution is mixed with an equivalent amount of naphthalene β-sulfonic acid in aqueous solution, and the resulting solution containing the two compounds is neutralized with barium hydroxide. Barium sulfate which is formed is removed by filtration, and the resulting filtrate is allowed to stand in the cold until the crystalline naphthalene β-sulfonic acid salt of streptomycin crystallizes from solution. The crystalline salt can then be filtered off and dried.

The streptomycin compounds which form salts with the naphthalene β-sulfonic acid have at least one salt-forming amino group. Preferably the streptomycin compounds are those which contain at least three salt-forming amino groups. The most important of the salt-forming streptomycin compounds are streptomycin itself and dihydrostreptomycin, each containing three salt-forming amino groups. This latter compound is formed by the catalytic hydrogenation of the carbonyl group in streptomycin to a hydroxyl group. Other biologically active derivatives of streptomycin which form salts with the naphthalene β-sulfonic acid can be prepared by reacting the free aldehyde group of streptomycin with various primary amines to form aldimines, and then hydrogenating this product to the amine. Other amine-containing streptomycins include alkyl and hydroxyalkyl streptomycins.

This invention is also useful in purifying streptomycin as found in crude concentrates. For example, crude streptomycin trihydrochloride isolated from fermentation broth by adsorption on a cation-exchange resin followed by elution with aqueous hydrochloric acid is conveniently recovered from solution by precipitation as its naphthalene β-sulfonic acid salt. The streptomycin salt so obtained, when converted to a simple salt, such as streptomycin sulfate, is found to have considerably higher potency than did the original crude material. Or, if desired, the naphthalene β-sulfonic acid salt of streptomycin can be still further purified by recrystallization from water.

The following examples illustrate various methods of carrying out the present invention, but it is to be understood that these examples are given by way of illustration and not of limitation.

Example 1

About 15 gms. of streptomycin sulfate assaying 750 γ/mg. is dissolved in 20 ml. of water. About 6.3 gms. of hydrated barium hydroxide dissolved in 52 ml. of water is added, and then the solution is neutralized with about 15 gms. of naphthalene β-sulfonic acid in 35 ml. of water. The resulting mixture is filtered to remove the precipitated barium sulfate and the filtrate is cooled to 7° C., and stored at this temperature overnight. The precipitate consisting of white needles is then filtered, washed with cold water and dried in vacuo over calcium chloride. The precipitate is further dried in vacuo at 100° C. for 3 hrs. The crystalline salt of naphthalene β-sulfonic acid and streptomycin having the empirical formula $$(C_{21}H_{39}N_7O_{12})(C_{10}H_7SO_3H)_3$$

is then analyzed chemically with the following results: Calcd. for $C_{51}H_{63}N_7O_{21}S_3$: C, 50.78; H, 5.26; N, 8.13; S, 7.97. Found: C, 50.69; H, 5.54; N, 8.45; S, 8.35.

Example 2

About 10 gms. of dihydrostreptomycin sulfate is dissolved in a minimum amount of water and to the solution is added about 10 gms. of naphthalene β-sulfonic acid in 20 ml. of water. Sufficient methanol is added to redissolve the precipitate that forms, then the solution is adjusted to pH 5.5 with an aqueous solution of barium hydroxide. The precipitated barium sulfate is filtered and the methanol is removed from the filtrate by distillation in vacuo. The white needles of the naphthalene β-sulfonic acid salt of dihydrostreptomycin that have precipitated during the crystallization are filtered, washed with cold water and dried in vacuo. Additional crops of the salt are obtained by further concentration of the mother liquor. Chemical analysis of the first crop after drying for 3 hrs., in vacuo at 100° C. is as follows: Calcd. for $C_{51}H_{65}N_7O_{21}S_3$: C, 50.69; H, 5.42; N, 8.11; S, 7.96. Found: C, 50.95; H, 5.60; N, 8.33; S, 7.95.

About 11 gms. of the naphthalene β-sulfonic acid salt of dihydrostreptomycin assaying about 450 γ/mg. is dissolved in 280 ml. of methanol and the dihydrostreptomycin sulfate is precipitated by the addition of a slight excess of triethylamine sulfate in methanol. The dihydrostreptomycin sulfate when filtered, washed with methanol, and dried assays about 760 γ/mg. The methanol filtrate contains about 2% of the original biological activity.

Example 3

About 1.4 liters of an aqueous methanol solution of crude streptomycin trihydrochloride assaying about 5300 γ/ml., prepared by precipitating streptomycin from fermentation broth as its Orange II dye salt, then decomposing the salt with barium chloride in aqueous methanol, is hydrogenated to dihydrostreptomycin. The resulting solution is evaporated in vacuo, then the residual water is displaced by the slow introduction of methanol. The methanol-insoluble inorganic salts are filtered, and dihydrostreptomycin sulfate is recovered from the filtrate by addition of triethylamine sulfate in methanol. The dihydrostreptomycin sulfate is dissolved in a minimum amount of water, about 10 gms. of naphthalene β-sulfonic acid in 20 ml. of water is added, and then the solution is neutralized with aqueous barium hydroxide. The precipitated barium sulfate is filtered, then the filtrate is seeded and allowed to stand in the cold. The white crystals of the naphthalene β-sulfonic acid salt of dihydrostreptomycin are filtered, washed with cold water, and dried. The yield is 8.4 gms. assaying about 410 γ/mg. Additional dihydrostreptomycin is obtained by further concentration of the mother liquors.

Example 4

About 10 gms. of crude streptomycin trihydrochloride, assaying about 325 γ/mg. is dissolved in 25 ml. of water. To this solution is added about 10 gms. of naphthalene β-sulfonic acid in a minimum amount of water. After standing overnight at about 7° C., the white crystals of naphthalene β-sulfonic acid salt of streptomycin are filtered, washed with ice water, and dried in vacuo. The precipitate is found to weigh about 2.4 gms. and assay 270 γ/mg. Additional crystals of the naphthalene β-sulfonic acid salt of streptomycin are obtained by further concentrating the mother liquor. A portion of the first crop of salt is recrystallized from water and found to assay about 300 γ/mg.

Example 5

About 4.3 gms. of streptomycin sulfate is dissolved in 20 ml. of water. To this is added 4 gms. of naphthalene β-sulfonic acid and the resulting solution is stored overnight at 7° C.. Then the white crystals that have formed are filtered, washed with anhydrous alcohol, and dried in vacuo. The product is found to assay 317 γ/mg.

In carrying out the process of the present invention, the reactants in separate aqueous solution are mixed together. The streptomycin solution can be added either to the sulfonic acid or sulfonic acid salt solution or, alternatively, the sulfonic acid or sulfonic acid salt solution can be added to the streptomycin solution.

Since the naphthalene β-sulfonic acid salt of streptomycin is reasonably insoluble even in aqueous acid solutions, it is practical to carry out this invention under any conditions of acidity or alkalinity, the limitation being that streptomycin should be substantially stable under the conditions used. However, the preferred pH of reaction is around pH 5.5, this being the acidity of the normal salt, formed by the reaction of naphthalene β-sulfonic acid with streptomycin.

Although with sufficiently concentrated solutions, good yields of the naphthalene β-sulfonic acid salt of streptomycin, can be obtained from aqueous solution at room temperature, due to the relatively great increase in solubility with increasing temperature, it is preferred for highest yields to lower the temperature of the reaction mixture to less than 10° C. after mixing the solutions, and allow the reaction mixture to stand until crystallization of the product is complete.

In the preferred process for preparing the crystalline salts of this invention barium hydroxide is used as illustrated by the examples. It should be understood, however, that satisfactory results can also be obtained by neutralizing the solution containing the streptomycin salt and the sulfonic acid with other alkaline materials such as sodium hydroxide, potassium hydroxide, triethylamine, dimethylamine and the like.

Among the numerous advantages of the naphthalene β-sulfonic acid salt of streptomycin is its solubility in methanol or aqueous methanol. Because of this fact, it can be readily precipitated from aqueous solution, dissolved in methanol or aqueous methanol, for example 90% methanol-10% water, and converted to any of numerous simple salts such as streptomycin sulfate. This is accomplished through a metathesis reaction with methanolic triethylamine sulfate.

As many apparently widely different embodiments of this invention may be made without departing from the spirit and scope hereof, it is to be understood that the invention is not limited to the specific embodiments hereof except as defined in the appended claims.

We claim:

1. A crystalline salt of naphthalene β-sulfonic acid and streptomycin.

2. A crystalline salt of naphthalene β-sulfonic acid and dihydrostreptomycin.

3. A process which comprises dissolving streptomycin sulfate in water, adding sufficient barium hydroxide to precipitate all the sulfate radical as barium sulfate, neutralizing the solution with naphthalene β-sulfonic acid, filtering off the barium sulfate, cooling the solution and maintaining it in the cold until the crystallization of the naphthalene β-sulfonic acid salt of streptomycin occurs and recovering the solid crystalline naphthalene β-sulfonic acid salt of streptomycin.

4. A process which comprises neutralizing with naphthalene β-sulfonic acid an alkaline water solution of a water-soluble salt of an antibiotic substance selected from the group consisting of streptomycin and dihydrostreptomycin, cooling the resulting solution until crystallization of the naphthalene β-sulfonic acid salt of the antibiotic substance occurs and recovering the crystalline salt.

5. A process which comprises commingling a water solution of a water-soluble salt of an antibiotic substance selected from the group consisting of streptomycin and dihydrostreptomycin with naphthalene β-sulfonic acid and an alkaline neutralizing material, maintaining the mixture at a pH of about 5.5, cooling the resulting solution until crystallization of the naphthalene β-sulfonic acid salt of the antibiotic substance occurs, and recovering the crystalline salt.

6. Salts of naphthalene β-sulfonic acid and an antibiotic substance selected from the group consisting of streptomycin and dihydrostreptomycin.

RUDOLPH A. CARBONI.
PETER P. REGNA.

References Cited in the file of this patent

UNITED STATES PATENTS

| Number | Name | Date |
|---|---|---|
| 2,462,175 | Folkers | Feb. 22, 1949 |
| 2,501,014 | Wintersteiner et al. | Mar. 21, 1950 |

OTHER REFERENCES

Peck et al., JACS, v. 68 (1946), p. 772–776.
Kocholaty et al., Arch. Biochem. 1947, p. 59.